United States Patent

Butler

[15] 3,683,225
[45] Aug. 8, 1972

[54] ORANGE-REFLECTIVE GRATICULE SCALE FOR CATHODE RAY TUBE

[72] Inventor: Marlow D. Butler, Portland, Oreg.
[73] Assignee: Tektronix, Inc., Beaverton, Oreg.
[22] Filed: March 20, 1970
[21] Appl. No.: 21,401

[52] U.S. Cl............313/92 SC, 178/7.84, 313/109.5
[51] Int. Cl..............................................H01j 29/34
[58] Field of Search...313/68 A, 92, 109.5; 178/7.83, 178/7.84

[56] References Cited

UNITED STATES PATENTS

| | | | |
|---|---|---|---|
| 2,251,984 | 8/1941 | Cleaver et al. | 178/7.84 |
| 3,274,421 | 9/1966 | Johnson | 178/7.84 X |
| 2,579,020 | 12/1951 | Smith | 106/301 X |
| 3,207,936 | 9/1965 | Wilbanks et al. | 313/64 |
| 3,361,270 | 1/1968 | Swedlund | 313/109.5 X |
| 3,443,973 | 5/1969 | Bugosh et al. | 106/301 X |
| 3,418,156 | 12/1968 | Medert et al. | 106/49 UX |

OTHER PUBLICATIONS

Killeffer et al., Molybdenum Compounds, Interscience Publishers, New York, 1952; QD 181 M7K5 in Scientific Library; page 35 cited

*Primary Examiner*—Robert Segal
*Attorney*—Buckhorn, Blore, Klarquist and Sparkman

[57] ABSTRACT

A graticule scale for a cathode ray tube is described which is made of a light reflecting material of chromatic color in the wavelength range of 5850 to 6500 angstroms, such as an orange of 6010 angstroms. The graticule scale may be provided on the inner surface of the flat glass faceplate of such tube and illuminated by light from an external source transmitted through the outer edge of such faceplate. The graticule scale of the present invention has the advantage that it is easily visible both in conditions of high ambient lighting due to its chromatic color and when used as a lighted graticule for photography purposes or for viewing in a dark room.

5 Claims, 4 Drawing Figures

PATENTED AUG 8 1972

3,683,225

MARLOW D. BUTLER
INVENTOR

BY
BUCKHORN, BLORE, KLARQUIST & SPARKMAN
ATTORNEYS

3,683,225

ORANGE-REFLECTIVE GRATICULE SCALE FOR CATHODE RAY TUBE

BACKGROUND OF THE INVENTION

The subject matter of the present invention relates generally to graticule scales and, in particular, to graticule scales employed for cathode ray tubes to indicate the dimensions of electrical signal waveforms displayed on the phosphor viewing screens of such tubes. The term "cathode ray tube," as used herein, refers to any electron tube having a phosphor screen which emits a light image when an electron beam is directed onto such screen, including tubes employing a photocathode, conventional cathode ray tubes having a beam which is deflected to form the display, and direct viewing storage tubes.

Graticule scales have previously been provided for cathode ray tubes either as an external graticule provided on a separate light transparent plate of glass or plastic material positioned in front of the faceplate of the tube, or as an internal graticule provided on the inner surface of the tube faceplate. Internal graticules have the advantage that, for the viewer, there is no image parallax between the graticule scale and the electron image produced on the phosphor screen coated over such graticule scale.

It has previously been the practice to provide an internal graticule scale either as a nonilluminated scale of black colored lines or as an illuminated scale of white colored lines of glass frit or the like. This latter type of graticule scale is shown in U.S. Pat. No. 3,207,936 of Wilbanks et al, filed Sept. 27, 1965, and owned by the assignee of the present application. Both of these previous types of internal graticule scales suffer from different disadvantages. Thus, the nonilluminated scale of black lines is adequate for viewing in a room of high ambient light, but is completely unsatisfactory for photography or for viewing in a dark room. On the other hand, the illuminated graticule of white lines is satisfactory for photography purposes or for viewing in a dark room, but is difficult to see in a room of high ambient lighting because of the lack of contrast between such lines and the generally white colored phosphor screen.

The graticule scale of the present invention overcomes the disadvantages of the two previous types of graticule scales by employing graticule lines of a light reflecting material of chromatic color, as opposed to the achromatic colors of black, white and gray. The preferred chromatic colors lie in the wavelength range of 5850 to 6500 angstroms, including an optimum orange color of about 6010 angstroms. The results is a graticule scale of high visibility when used as an unlighted graticule viewed in a room of high ambient lighting since there is good color contrast between such chromatic colored graticule and the phosphor viewing screen, and when used as a lighted graticule for photography or for viewing in a dark room due to the high light reflection of such graticule. Thus, the present graticule scale has the advantages of both the two prior art graticules of black and white lines without their attendant disadvantages.

It is, therefore, one object of the present invention to provide an improved graticule for a cathode ray tube of a chromatic color having high contrast and good visibility under all lighting conditions, including a room of high ambient light.

Another object of the invention is to provide such a graticule with a light reflecting material of a chromatic color in the wavelength range of 5850 to 6500 angstroms.

A further object of the invention is to provide such a graticule scale on a light transparent support member which can be illuminated by transmitting light into such support member for viewing the graticule under dark ambient lighting conditions and for photography.

Still another object of the present invention is to provide such a graticule scale of an orange color having a wavelength of about 6010 angstroms.

Still another object of the invention is to provide such graticule as an internal graticule under the phosphor screen layer on the inner surface of the faceplate portion of the envelope of a cathode ray tube to eliminate any parallax between the graticule image and the image displayed on the phosphor screen.

BRIEF DESCRIPTION OF THE DRAWINGS

Other objects and advantages of the present invention will be apparent from the following detailed description of a preferred embodiment thereof and from the attached drawings of which.

DESCRIPTION OF PREFERRED EMBODIMENT

Figure 1:
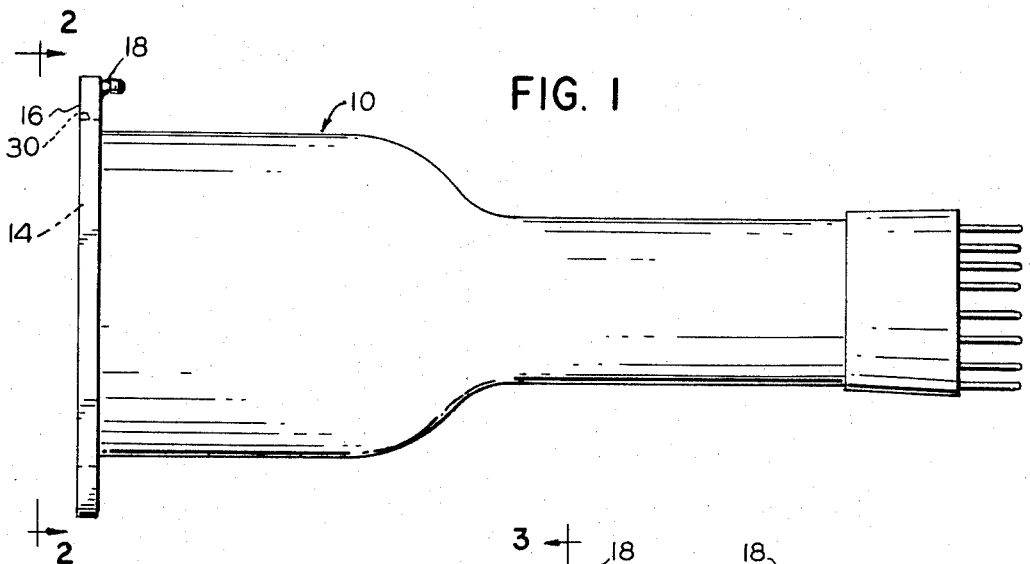
FIG. 1 is a side elevation view of a cathode ray tube employing one embodiment of the graticule scale of the present invention.
Figure 2:
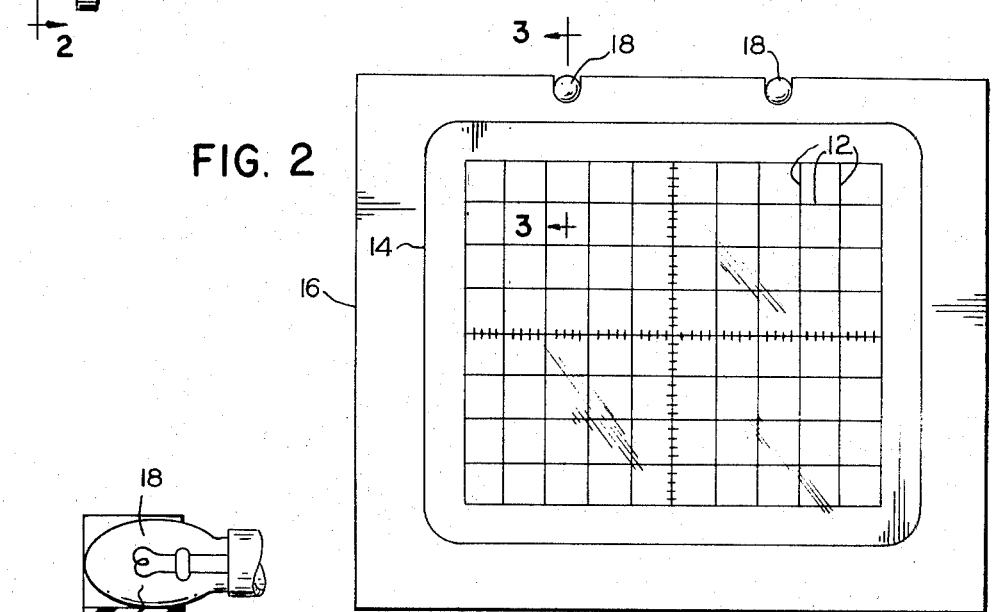
FIG. 2 is a front elevation view of the cathode ray tube of FIG. 1.

As shown in FIGS. 1 and 2, a cathode ray tube 10 made in accordance with one embodiment of the present invention is provided with internal graticule scale 12 of light reflecting material of chromatic color, preferably an orange color in the wavelength range of 5850 to 6500 angstroms, on the inner surface of a flat glass faceplate 14 portion of the tube envelope. The faceplate is surrounded by a light guide member 16 of light transparent glass or plastic material, such as methylmethacrylate. A plurality of incandescent light bulbs 18, or other suitable light sources, are provided in holes or notches formed in the light guide member 16 for transmitting light into such light guide member and on into the faceplate for illuminating the graticule scale 12, as shown by the light ray 20 in FIG. 3.

The cathode ray tube 10 may have an all glass envelope but is preferably formed with a ceramic funnel portion 22, the open end of which is sealed to the flat side of the glass faceplate 14 by an intermediate seal layer 24 of glassy material different than that of the faceplate, as shown in U. S. Pat. No. 3,207,936 discussed above. The cathode ray tube contains an electron gun and is provided with either electrostatic deflection plates inside the tube or electromagnetic deflection coils outside such tube in the conventional manner.

Figure 3:
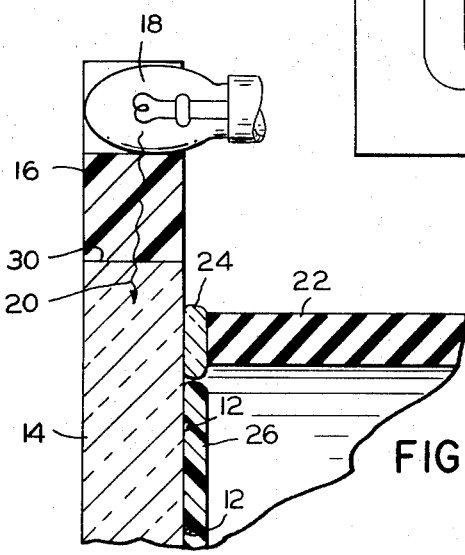
FIG. 3 is a partial vertical section view taken along the line 3—3 of FIG. 2 on an enlarged scale showing the interior of the tube.

As shown in FIG. 3, a phosphor layer 26 is coated over the graticule scale 12 on the inner surface of the glass faceplate 14. The phosphor layer 26 may function merely as a conventional phosphor screen, or it may also act as the storage dielectric of a direct viewing bistable storage tube of the type shown in U. S. Pat. No. 3,214,631 of R. H. Anderson, in which case a thin light transparent conductive layer of tin oxide (not shown) may be provided beneath the phosphor layer. Of course, even when the phosphor layer 26 functions as a storage dielectric, it also acts as a phosphor viewing screen for emitting a light image of the charge image stored on such dielectric.

Figure 4:
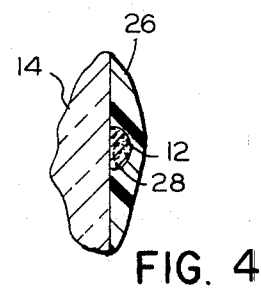
FIG. 4 is an enlarged view of a portion of FIG. 3 showing a cross section of one line of the graticule scale.

The graticule scale 12 of the present invention may be in the form of intersecting lines of glass frit which is mixed with an organic binder solution, deposited by "silk screen" printing and fused to the surface of the faceplate 14 by heating above the fusion point of such frit after burning out the organic binder. A chromatic color material 28, shown for purposes of clarity as a plurality of particles or spots in FIG. 4, is provided in the ground glass frit. However, it should be understood that this color material forms part of the glass used for the frit. It has been found to be preferable to use chromatic colors in the wavelength range of 5850 to 6500 angstroms, and the optimum color is an orange of about 6010 angstroms. The chromatic color may be made of a 50—50 mixture of a first glass containing cadmium oxide and a second glass containing molybdenum oxide. The two glasses may be the lead borosilicate of glasses, including one containing cadmium oxide which is sold as "Vermillion Red No. 2144-A14" and one containing molybdenum oxide which is sold as "Bright Orange No. 2830-No. A13" by Ceramic Color and Chemical Manufacturing Company of New Brighton, Pennsylvania. The glass frit of the graticule fuses at about 520° C., which is lower than the melting point of the faceplate 14 and above the melting point of the glass seal 24. This enables the graticule lines of colored glass frit to be fused to the faceplate before such faceplate is sealed to the ceramic funnel. Thus, both the graticule and the phosphor viewing screen may be provided on the flat glass faceplate before it is sealed to the ceramic funnel portion thereby greatly facilitating the manufacture of the cathode ray tube.

As shown in FIG. 3, the light rays 20 are transmitted into the faceplate 14 through a light transparent outer edge 30 surrounding such faceplate and extending between its two flat side surfaces. The light easily penetrates into the glass faceplate since it strikes the outer edge 30 substantially perpendicular thereto. The light guide member 16 uniformly distributes the light from bulbs 18 around the outer edge 30 of the faceplate to provide a uniform illumination of the graticule scale 12. The graticule lines 12 reflect a portion of the light out through the front surface of the faceplate to the observer standing in front of the cathode ray tube.

It should be noted that the graticule scale of the present invention may also be provided as an external graticule on a light transparent support plate positioned outside the cathode ray tube in front of the faceplate of such tube. If this is done, the graticule support plate may be made of glass or plastic and the graticule lines may be either painted on the surface of the plate or deposited in grooves or notches formed in such external support plate without the use of glass frit. In this embodiment, the light bulbs 18 may be mounted in slots within the external graticule plate and the light guide member 16 eliminated.

It will be obvious to those having ordinary skill in the art that many changes may be made in the details of the above-described preferred embodiment of the present invention without departing from the spirit of the invention. Therefore, the scope of the present invention should only be determined by the following claims.

I claim:

1. A cathode ray tube apparatus including an envelope having a faceplate portion of light transparent glass and a phosphor layer provided on the inner surface of said faceplate within said envelope, in which the improvement comprises:
    an internal graticule means including graticule scale lines of an orange colored light reflecting material provided on said inner surface of said faceplate beneath said phosphor layer, said orange material having maximum reflectivity for wavelengths in the orange portion of the visible spectrum.

2. Apparatus in accordance with claim 1 in which the light reflecting material is of an orange color having a wavelength of about 6010 angstroms.

3. Apparatus in accordance with claim 1 in which the material of the graticule scale also includes a glass frit which is fused to the faceplate.

4. Apparatus in accordance with claim 1 in which the light reflecting material is a mixture of cadmium oxide and molybdenum oxide.

5. Apparatus in accordance with claim 4 in which the light reflecting material is provided in a glass frit containing lead borosilicate glass.

* * * * *